(12) United States Patent
Poillot et al.

(10) Patent No.: US 9,701,284 B2
(45) Date of Patent: Jul. 11, 2017

(54) SYSTEM FOR LOCKING/UNLOCKING AN OBJECT ON A STRUCTURE HAVING BEARING AND ALIGNING ELEMENTS BUILT INTO THE TOOLS

(71) Applicant: RENAULT s.a.s, Boulogne-Billancourt (FR)

(72) Inventors: Jacques Poillot, Villepreux (FR); Gilles Mulato, Chatillon (FR); Stephane Trentin, Viry-Chatillon (FR); Bruno Escande, Septeuil (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 133 days.

(21) Appl. No.: 14/385,301

(22) PCT Filed: Mar. 1, 2013

(86) PCT No.: PCT/FR2013/050439
§ 371 (c)(1),
(2) Date: Oct. 22, 2014

(87) PCT Pub. No.: WO2013/153300
PCT Pub. Date: Oct. 17, 2013

(65) Prior Publication Data
US 2015/0033537 A1  Feb. 5, 2015

(30) Foreign Application Priority Data

Mar. 15, 2012  (FR) ..................... 12 52312

(51) Int. Cl.
*B60S 5/06* (2006.01)
*B60K 1/04* (2006.01)
*H01M 2/10* (2006.01)

(52) U.S. Cl.
CPC .................. *B60S 5/06* (2013.01); *B60K 1/04* (2013.01); *H01M 2/1083* (2013.01);
(Continued)

(58) Field of Classification Search
CPC .......... B60S 5/06; H01M 2/1083; B60K 1/04; B60K 2001/0472; B60K 2001/0438; Y10T 29/53; Y10T 29/49826; Y02T 90/124
See application file for complete search history.

(56) References Cited

U.S. PATENT DOCUMENTS

| 5,612,606 A | 3/1997 | Guimarin et al. |
| 2007/0113921 A1* | 5/2007 | Capizzo ............... B60K 15/063 141/231 |

(Continued)

FOREIGN PATENT DOCUMENTS

| FR | 2 946 572 | 12/2010 |
| FR | 2 952 334 | 5/2011 |
| FR | 2 964 352 | 3/2012 |

OTHER PUBLICATIONS

French Search Report Issued Dec. 13, 2012 in Application No. FR 1252312 Filed Mar. 15, 2012.

(Continued)

*Primary Examiner* — John C Hong
(74) *Attorney, Agent, or Firm* — Oblon, McClelland, Maier & Neustadt, L.L.P.

(57) ABSTRACT

The invention relates to a system for locking and/or unlocking a power battery under a vehicle chassis, comprising a plurality of tools, each of which includes elements for aligning said tool relative to the battery along a longitudinal axis and along a transverse axis, elements for bearing against the underside of the chassis and enabling balancing, and locking and/or unlocking elements for actuating an attachment bolt between a locked configuration, in which the battery is locked under the chassis, and an unlocked configuration, in which the object is released.

15 Claims, 5 Drawing Sheets

(52) U.S. Cl.
CPC ............... *B60K 2001/0438* (2013.01); *B60K 2001/0472* (2013.01); *Y02T 90/124* (2013.01); *Y10T 29/49826* (2015.01); *Y10T 29/53* (2015.01)

(56) References Cited

U.S. PATENT DOCUMENTS

2010/0071979 A1\* 3/2010 Heichal .................. B60K 1/04
   180/68.5
2012/0251281 A1 10/2012 Mulato

OTHER PUBLICATIONS

International Search Report Issued Jul. 23, 2013 in PCT/FR13/050439 Filed Mar. 1, 2013.

\* cited by examiner

SYSTEM FOR LOCKING/UNLOCKING AN OBJECT ON A STRUCTURE HAVING BEARING AND ALIGNING ELEMENTS BUILT INTO THE TOOLS

TECHNICAL FIELD OF THE INVENTION

The invention concerns a system for locking and/or unlocking an object, such as a power supply battery of a drive motor of an electric or hybrid motor vehicle, below a structure such as a chassis of the vehicle, the system comprising a plurality of tools allowing actuation of bolts for fixing the object on the structure.

The object of the invention is furthermore a device for mounting and/or removing the object below the structure, combining such a locking and/or unlocking system and a plurality of object/structure fixing bolts. It also concerns a method for removal and a method for mounting the object below the structure.

STATE OF THE ART

Certain motor vehicles, such as electric or hybrid vehicles, comprise a power supply container for an electric drive motor, of electric supply battery type. In the description which follows, the term "battery" will be used for simplicity as designating in the wide sense any electrical power container for an electric drive motor of a vehicle. It may prove useful to replace this battery, when its energy level is low, with a new charged battery. This may be done in an exchange station, such as for example a station similar to a service station for filling the tanks associated with internal combustion engines.

Document US 2011223459 discloses a method for mounting and removing a battery on an at least partially electric vehicle. Several locking units are mounted on the vehicle which can be controlled separately and each comprise a fixing bolt configured to be connected to the battery. The method comprises actuation of each of the locking units to cause the respective bolt to pivot in order to engage or disengage with the battery. The method comprises measuring a position of each bolt of the locking units, to monitor each of the locking units individually as a function of the position of its respective bolt, in order to synchronize the positions of all the bolts. A major drawback of this solution is the absence of a process of seating the vehicle, which requires fitting a complex actuation mechanism (at least one motor and several transmission shafts) on the vehicle to release the battery autonomously. The cost of such a solution is very high, often prohibitive, and not economic for the customer. This complexity makes the solution unviable and means that its operation is not robust.

An additional difficulty for installing such a battery exchange concept lies in the fact that there are a multitude of motor vehicles which may comprise batteries of different types, fixed to the motor vehicle in different ways. It is not economically feasible to multiply the systems for mounting and removal of these various types of batteries, nor to install a manual solution because of its cost and the weight of the batteries. There is therefore a need for a mounting/removal solution which is universal and can be standardized.

OBJECT OF THE INVENTION

To allow simple development of battery exchange solutions, it is necessary to make the functioning of these solutions reliable, robust, flexible and universal, while limiting their cost.

The object of the present invention is to provide a mounting and/or removal solution which makes it possible to remedy the problems outlined above. In particular, the invention proposes a simple, reliable and robust, flexible and universal solution which remains economic.

A first aspect of the invention concerns a system for locking and/or unlocking an object, such as a power supply battery of a drive motor of an electric or hybrid motor vehicle, below a structure such as a chassis of the vehicle. The system comprises a plurality of tools, each tool comprising:
  elements for aligning said tool in relation to the object along a longitudinal axis of the structure and along a transverse axis of the structure;
  elements for bearing against the underside of the structure, allowing seating of the structure around the longitudinal axis of the structure and/or around the transverse axis of the structure;
  locking and/or unlocking elements intended for actuating a fixing bolt between a locking configuration, blocking the object below the structure, and an unlocking configuration, releasing the object in relation to the structure.

The bearing elements may allow lifting of the structure along a vertical axis to a height independent of the structure.

The alignment elements may be configured so as to cooperate with centering elements integrated in the object, the alignment elements being inserted in the centering elements and/or the centering elements being inserted in the alignment elements.

Each tool may comprise release elements intended for actuating a safety mechanism of the fixing bolt between a blocking configuration, in which the fixing bolt cannot be transferred from one configuration to the other, and a release configuration, in which the fixing bolt can be transferred from one configuration to the other.

The bearing elements and/or the release elements may be formed by an upper end of at least one of the alignment elements The release elements may be configured such that contact of the bearing elements against the underside of the structure, on the seating of the structure and where applicable during its lifting, automatically initiates the actuation, via the release elements, of the safety mechanism toward its release configuration.

The bearing elements may be configured to come into contact, on the seating of the structure and where applicable during its lifting, with a bolt support interposed between the fixing bolt and the structure.

Each tool may comprise a carrier element designed to support the object after its release by the fixing bolts in relation to the structure.

The system may also comprise lifting elements on which the tools are mounted, the lifting elements being configured to move the tools between:
  a lower position arranged substantially next to or below a conveyor ensuring a supply of objects to be mounted on the structure, such as electrically charged batteries, and an evacuation of objects removed from the structure, such as electrically discharged batteries,
  and an upper position in which the tools may be in contact with the structure to ensure its seating and where applicable its lifting, and can actuate the fixing bolts.

A second aspect of the invention concerns a device for mounting and/or removal of an object, such as a power supply battery of a drive motor of an electric or hybrid motor vehicle, below a structure such as a chassis of the vehicle, the device comprising a locking and/or unlocking system of this kind, and a plurality of fixing bolts integral with the object and/or the structure, each of which can be actuated between a locking configuration, blocking the object on the structure, and an unlocking configuration, releasing the object in relation to the structure, and arranged such that the locking and/or unlocking elements of each tool of the locking and/or unlocking system actuate one of the fixing bolts to change its configuration.

A third aspect of the invention concerns a method for removal of an object, such as a power supply battery of a drive motor of an electric or hybrid motor vehicle, below a structure such as a chassis of the vehicle, the method comprising:

a step of aligning a plurality of tools in relation to the object carried by the structure along a longitudinal axis of the structure and along a transverse axis of the structure;

a step of seating the structure around the longitudinal axis of the structure and/or around the transverse axis of the structure by bringing the tools to bear against the underside of the structure, and where applicable by lifting the structure along a vertical axis of the structure;

an unlocking step in which each tool actuates a fixing bolt, integral with the object and/or the structure, from a locking configuration, initially blocking the object on the structure, to an unlocking configuration, releasing the object in relation to the structure.

Finally, a fourth aspect of the invention concerns a method for mounting an object, such as a power supply battery of a drive motor of an electric or hybrid motor vehicle, below a structure such as a chassis of the vehicle, the method comprising:

a step of aligning a plurality of tools in relation to the object along a longitudinal axis of the structure and along a transverse axis of the structure;

a step of seating the structure around the longitudinal axis of the structure and/or around the transverse axis of the structure by bringing the tools to bear against the underside of the structure, and where applicable by lifting the structure along a vertical axis of the structure;

a locking step in which each tool actuates a fixing bolt, integral with the object and/or the structure, from an unlocking configuration, initially releasing the object in relation to the structure, to a locking configuration, blocking the object on the structure.

BRIEF DESCRIPTION OF THE DRAWINGS

Other advantages and characteristics will arise more clearly from the description below of particular embodiments of the invention, given as non-limitative examples and shown on the attached drawings, in which.

DESCRIPTION OF PREFERRED
EMBODIMENTS OF THE INVENTION

The invention generally concerns the field of mounting and/or removal of an object below a structure. The principles of the invention will be described in relation to a particular non-limitative application, where the object is a power supply battery 10 of a drive motor of an electric or hybrid motor vehicle, and where the structure is a chassis 11 or a body of the vehicle. However, the invention may be applied in other areas where an object must be mounted on and/or removed from below a structure.

In this particular application where the structure is a chassis or a vehicle body, the description is given with reference to an orthogonal reference standard (X, Y, Z) conventionally associated with a motor vehicle, in which axis X is the longitudinal direction from front to rear of the vehicle, directed toward the rear, axis Y is the transverse direction from left to right, which is horizontal and perpendicular to X, directed toward the right, and axis Z is the vertical direction directed upward.

On each of FIGS. 1 to 14, the right-hand part of the figure diagrammatically shows a structure and an example of the mounting and/or removal device according to the invention. The left-hand part of each figure illustrates in detail the cooperation between one of the tools of the locking and/or unlocking system, which forms part of this mounting and/or removal device, and the structure and/or the object.

According to an essential characteristic of the invention, a system for locking and/or unlocking for the object (here the power supply battery 10) below the structure (here the vehicle chassis 11) comprises a plurality of actuating tools 12 (preferably four in number, distributed along a box X, Y) where each of these tools 12 comprises:

elements 13, 14 for aligning said tool 12 in relation to the object along the longitudinal axis X of the structure and along the transverse axis Y of the structure;

elements 15 for bearing against the underside 25 of the structure, allowing seating of the structure, in particular in a plane (X, Y), around the longitudinal axis X of the structure and/or around the transverse axis Y of the structure, and where applicable a lifting of the structure along the vertical axis Z of the structure to a height preferably independent of the structure;

locking and/or unlocking elements 16 intended for actuating a fixing bolt 17 between a locking configuration, blocking the object below the structure, and an unlocking configuration, releasing the object in relation to the structure.

The term "seating" means an operation consisting of applying mechanical forces to the structure which allow orientation of the structure according to a given spatial orientation (included or not) in relation to the plane (X, Y), this given orientation also being independent of the type of structure and any load conditions of the vehicle.

Thus, each of the tools 12 of the system is intended to cooperate with a bolt 17 associated therewith. Preferably, each bolt 17 comprises an endless screw which turns a pinion forming a hook 18. The shape of each hook 18 allows progressive compression of the object (battery 10) against the underside of the structure (chassis 11), where applicable with interposition of resilient return elements, not shown, (for example rubber studs) when the endless screw, the head of which is accessible from below the bolt 17 to which the screw belongs, is turned by use of the locking/unlocking elements 16, which in this case are a manual or automatic screwing/unscrewing tool.

In one embodiment having the advantage of its simplicity and efficacy, the alignment elements 13, 14 are configured so as to cooperate by introduction or insertion with centering elements 19, 20 integral with the object, i.e. the alignment elements 13, 14 are inserted in the centering elements 19, 20 and/or the centering elements 19, 20 are inserted in the alignment elements 13, 14. In the particular variant shown, the two alignment elements 13, 14 of each of the tools 12 consist of pilot pins, at least partially conical for self-centering, protruding from a base 21 integral with the tool 12. These two pilot pins are inserted in two holes (or lugs or openings or equivalent) forming the centering elements 19, 20 respectively and housed in a battery support 22 (also known as a runner) considered integral with the battery 10. In other words, the holes allowing centering of the pilot pins (by cooperation by introduction) are integral with the object. The arrangement of at least two pilot pins at the level of each of the tools 12 also allows the object to be blocked in rotation along axis Z in relation to the tool 12 in the case of cooperation by introduction.

In addition, the battery support 22 may be fitted with an additional hole 23 for the passage of the locking/unlocking elements 16 through the object to be mounted on the structure, in order to give access to the bolt 17 to be actuated. The existence and nature of this hole 23 depends on the nature of the elements 16, which itself is a function of the nature of the bolts 17.

In a particular embodiment, each bolt 17 is fitted with a safety mechanism which may vary between a blocking configuration, in which the fixing bolt 17 cannot be transferred from one configuration to the other, and a release configuration, in which the fixing bolt 17 can be transferred from one configuration to the other. In this particular case, each tool 12 may comprise release elements 24 intended for actuating the safety mechanism of the fixing bolt from the blocking configuration to the release configuration or vice versa.

It is clear from the above that each tool 12 integrates the elements 13, 14 for alignment along axes X and Y in relation to the object, the elements 15 for bearing against the underside of the structure along axis Z, the locking/unlocking elements 16 for the bolts 17 carried by the structure and/or by the object, and where applicable the release elements 24.

Advantageously, for simplicity, the bearing elements 15 and/or the release elements 24 are formed by an upper end (along axis Z) of at least one of the alignment elements 13, 14. In the variant illustrated, the bearing elements 15 are formed by the upper end of the alignment element 13 while the release elements 24, here designed to act by a vertical thrust, are formed by the upper end of the alignment element 14.

In a particular embodiment, the release elements 24 are configured such that contact of the bearing elements 15 against the underside 25 of the structure, on the seating of the structure in relation to the plane (X, Y) and where applicable during its lifting along direction Z, automatically initiates the actuation, via the release elements 24, of the safety mechanism toward its release configuration.

Preferably, the bearing elements 15 are configured to come into contact, on the seating of the structure and where applicable during its lifting, with a bolt support 26 interposed between the fixing bolt 17 and the structure. In other words, the bolt support 26 allows linking of a given bolt 17 with the structure (i.e. with the vehicle chassis 11). The underside 25 of the structure, against which the bearing elements 15 come into contact at the time of seating of the structure and where applicable its lifting, is formed in practice by a lower face of the bolt support 26. Such characteristics allow the solution to be made independent of the type of structure, making it easily standardizable.

To be able to support the battery 10 after its release by the bolts 17, each tool 12 comprises a carrier element 27 designed to support the object (battery 10) after its release by the fixing bolts 17 in relation to the structure (chassis 11). In the variant shown, the carrier element 27 is simply formed by a shoulder provided on the pilot pin constituting the alignment element 13, for example close to its area of connection to the base 21.

For use of tools 12 involving movement along axis Z (this movement being necessary at least for the alignment operation, for the seating operation and where applicable for the lifting operation), the locking and/or unlocking system, which comprises a plurality of such tools 12, also comprises lifting elements 28 on which the tools 12 are mounted, the lifting elements 28 being configured to move (individually or collectively) the tools 12 between:

a lower position (FIGS. 8, 9, 14) arranged substantially next to or below a conveyor 29 ensuring a supply of objects to be mounted on the structure, such as electrically charged batteries ("full"), and an evacuation of objects removed from the structure, such as electrically discharged batteries ("empty") (see FIG. 9), and an upper position in which the tools 12 may be in contact with the structure to ensure its seating (X, Y) and where applicable its lifting along axis Z, and can actuate the fixing bolts 17.

The locking and/or unlocking system described above may more generally form part of a device for mounting and/or removing the object below a structure, also comprising a plurality of such fixing bolts 17 integral with the object and/or the structure. The bolts 17 can each be actuated between a locking configuration, blocking the object on the structure, and an unlocking configuration, releasing the object in relation to the structure. The bolts 17 are arranged such that the locking and/or unlocking elements 16 of each tool 12 of the locking and/or unlocking system actuate one of the fixing bolts 17 to change its configuration.

An example of functioning of the locking and/or unlocking system, and more generally of the mounting and/or removal device, is described below with reference to FIGS. 1 to 14:

FIGS. 1 to 8 illustrate various successive steps during the removal of a battery 10 below a vehicle chassis 11. In general, described in more detail below, the removal of an object, such as a battery 10, below a structure such as a vehicle chassis 11, comprises:

a step of aligning (FIG. 2) a plurality of tools 12 in relation to the object (i.e. the battery 10, or in particular its support 22) carried by the structure (i.e. the chassis 11) along the longitudinal axis X and along the transverse axis Y of the structure;

a step of seating (FIG. 3) the structure around the longitudinal axis X and/or around the transverse axis Y by bringing the tools 12 to bear against the underside 25 of the structure, and where applicable a step of lifting (FIG. 4) the structure along the vertical axis Z, by bringing the tools 12 to bear against the underside 25 of the structure;

an unlocking step (FIGS. 5 and 6) in which each tool 12 actuates a fixing bolt 17, integral with the object and/or the structure, from a locking configuration, initially blocking the object on the structure, to an unlocking configuration, releasing the object in relation to the structure.

Figure 1:
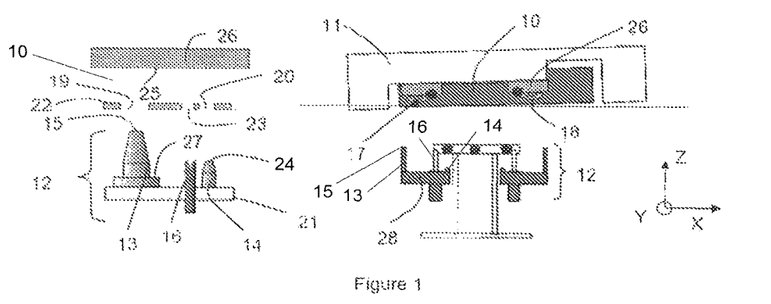
FIGS. 1 to 8 illustrate various successive steps of a solution according to the invention for removal of a battery below a vehicle chassis.
Figure 2:
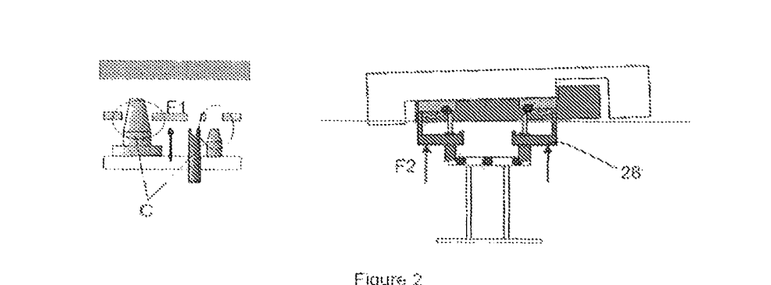
Figure 3:
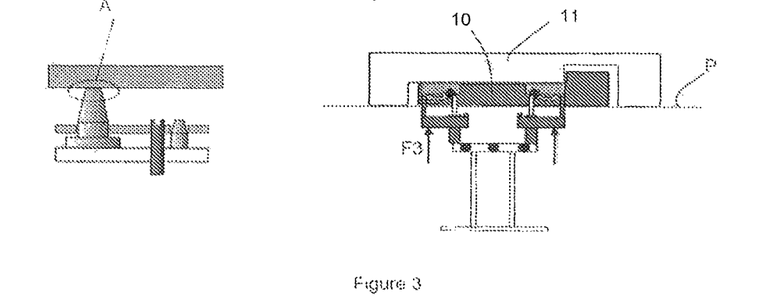
Figure 4:
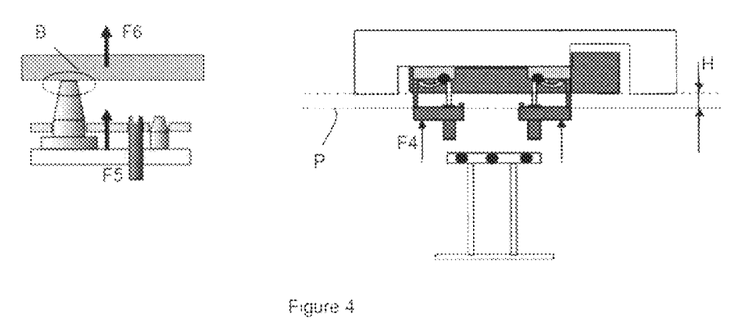

Starting from an initial situation as shown in FIG. 1 where the battery 10 and its support 22 are carried by the vehicle chassis 11 thanks to bolts 17 adopting their locking configurations, the tools 12 are moved upward F1 along axis Z until they cause cooperation by introduction C of the alignment elements 13, 14 of the tool 12 with the centering elements 19, 20 integral with the battery support 22 (FIG. 2). The movement F1 of the tools 12 results from a corresponding movement F2 of the lifting elements 28. The introduction of the alignment elements 13, 14 in the centering elements 19, 20 allows the alignment of the plurality of tools 12 in relation to the battery 10 (or in particular its support 22) carried by the chassis 11 thanks to the bolts 17, this alignment taking place along the longitudinal axis X and along the transverse axis Y. The chassis 11 may then in some cases not be correctly positioned in relation to a horizontal plane P oriented according to (X, Y), as the configuration of the vehicle and hence of the chassis depend only on its particular conditions (own height, load etc.).

The lifting elements 28 then undergo a supplementary upward movement F3 (FIG. 3) along axis Z so as to move the tools 12 in synchrony in order to ensure seating (FIG. 3) of the chassis around the longitudinal axis X and/or around the transverse axis Y, by bringing A the tools 12 to bear against the underside 25 of the structure, orienting the chassis in relation to the plane P according to a predetermined orientation (aligned or not), independently of the chassis 11 and its possible load.

The lifting elements 28 then undergo a supplementary upward movement F4 (FIG. 4) along axis Z so as to move the tools 12 in synchrony in order to move F5 the tools 12 upward along axis Z, to ensure a lifting F6 of the battery 10 and chassis 11 along the vertical axis Z, by bringing B the tools 12 to bear against the underside 25 of the structure, causing the shift F6 of the chassis 11 in relation to the plane P to a height H of the plane P. Thus the reference position adopted by the vehicle on removal of a battery 10 may advantageously be independent of the nature of the chassis and hence of the vehicle, and of the nature of the battery, the ground etc.

Figure 5:
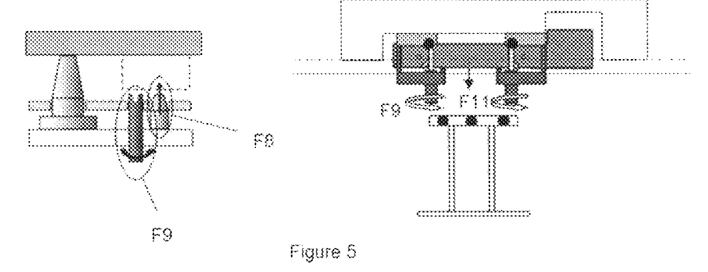
Figure 6:
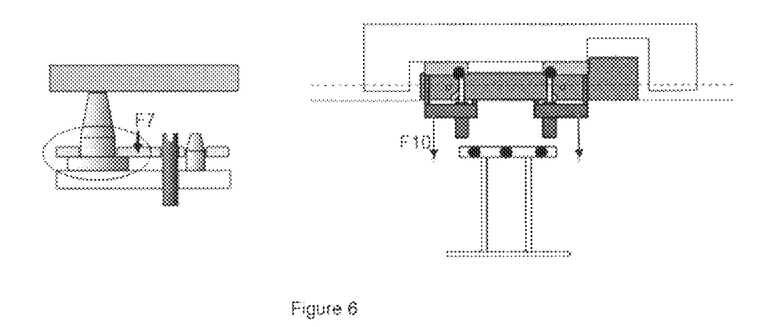
Figure 7:
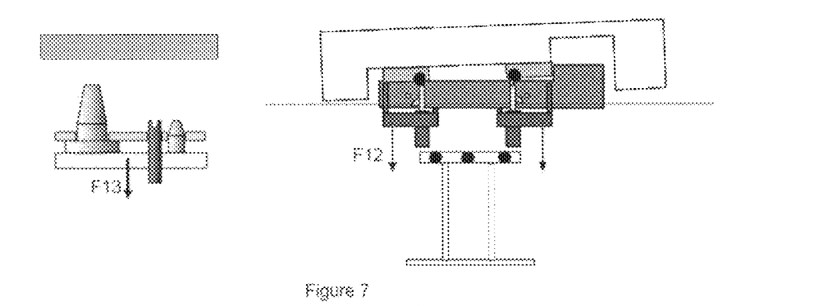

With reference to FIG. 5, the unlocking elements 16 of each tool 12 actuate the fixing bolt 17 from a locking configuration, initially blocking the battery 10 on the chassis 11, to an unlocking configuration, releasing the battery 10 in relation to the chassis 11. This unlocking results for example from an unscrewing action, symbolized by the rotary arrows F9. The chassis 11 remains at a height H in relation to plane P while the battery 10 is lowered F11 along axis Z under the action of the hooks 18, which pivot downward during unscrewing to come to rest F7 under gravity on the carrier element 27 of the tool 12 and cause a controlled disconnection of the battery 10. In the variant shown, the actuation of the bolt 17 is conditional upon the release F8 of the safety mechanism of the bolt 17 by the release elements 24.

Then the lifting elements 28 are lowered F10 along axis Z (FIG. 6) such that the chassis 11 is also lowered, to draw progressively closer to the plane P. During these operations, the contact between the bolt supports 26 and the bearing elements 15 is maintained.

The lowering F12 of the lifting elements 28 is extended (FIG. 7) so as to move F13 the assembly formed by the tools 12 and the battery 10 (and its support 22) until a loss of contact between the bearing elements 15 and the underside 25 of the chassis 11. The seating operation is terminated and the vehicle (and hence the chassis 11) resumes an arbitrary and free orientation in relation to the plane P.

Figure 8:
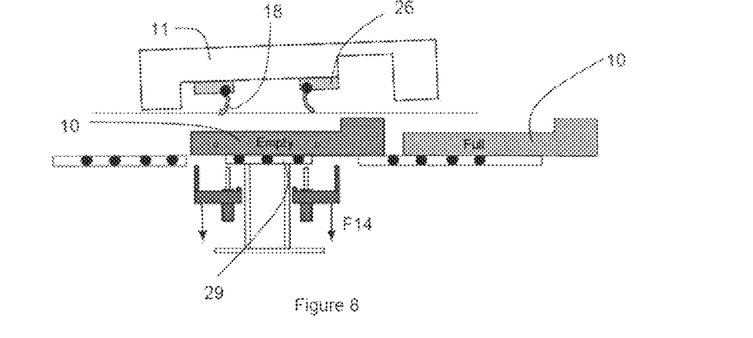

Finally, with reference to FIG. 8, the lifting elements 28 are lowered F14 so that the battery 10 is deposited on the conveyor 29 and adopts its lower position. Once the battery 10 is deposited, theoretically faulty or electrically discharged ("empty"), it is evacuated F15 by the conveyor 29.

FIGS. 9 to 14 then illustrate various successive steps during the mounting of a battery 10 below a vehicle chassis 11. In general, described in more detail below, the mounting of an object, such as a battery 10, below a structure such as a vehicle chassis 11 comprises:

a step of aligning (FIG. 10) a plurality of tools 12 in relation to the object (i.e. a battery 10 or in particular its support 22) along the longitudinal axis X and along a transverse axis Y;

a step of seating (FIG. 11) the structure around the longitudinal axis X and/or around the transverse axis Y by bringing the tools to bear against the underside of the structure, and where applicable a step of lifting (FIG. 11) the structure along the vertical axis Z by bringing the tools 12 to bear against the underside of the structure;

a locking step (FIG. 12) in which each tool 12 actuates a fixing bolt 17, integral with the object and/or the structure, from an unlocking configuration, initially releasing the object in relation to the structure and allowing the positioning of the object on the structure, to a locking configuration, blocking the object on the structure after it has been positioned.

Figure 9:
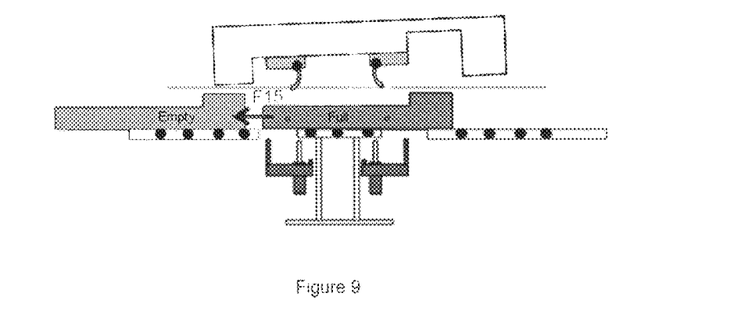
FIGS. 9 to 14 illustrate various successive steps of a solution according to the invention for mounting a battery below a vehicle chassis.
Figure 10:
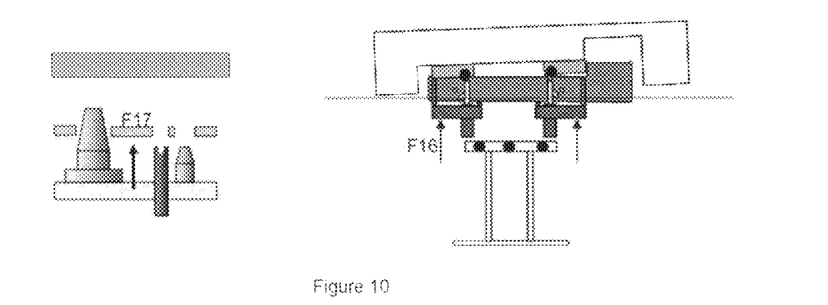

Before the step of alignment, the electrically charged battery 10 ("full") is supplied by the conveyor 29 (FIG. 9). The step of alignment (FIG. 10) between the tools 12 and the battery 10 resting on the conveyor 29 is performed automatically at the time when the alignment elements 13, 14 are introduced in the centering elements 19, 20, during the movement F17 of the tools 12 resulting from an upward movement F16 of the lifting elements 28.

Figure 11:
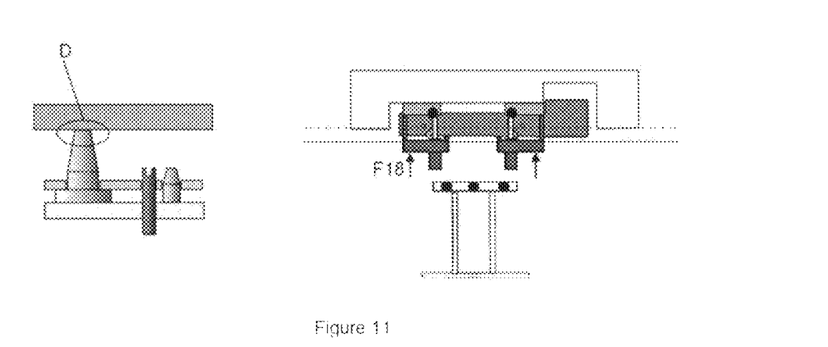

Then the lifting elements 28 are moved F18 upward for seating of the chassis 11 in relation to the plane P and where applicable for lifting the chassis 11 to a height H of the plane P (FIG. 11). During these operations, a contact D is established between the bearing elements 15 and the underside 25 of the chassis 11, namely at the level of the bolt supports 26.

Figure 12:
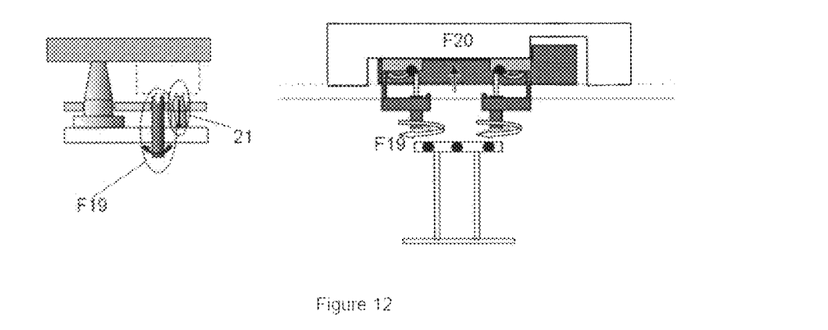
Figure 13:
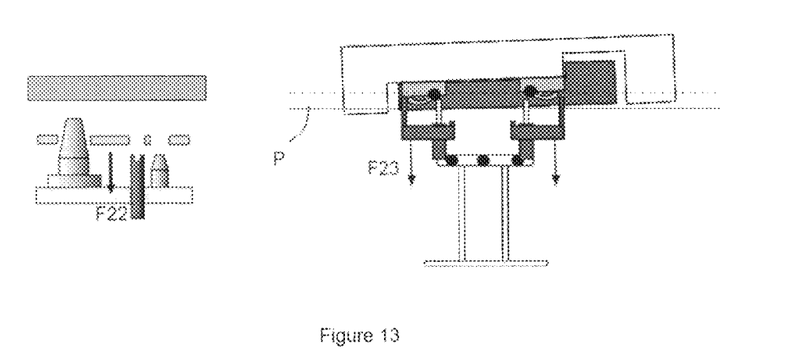
Figure 14:
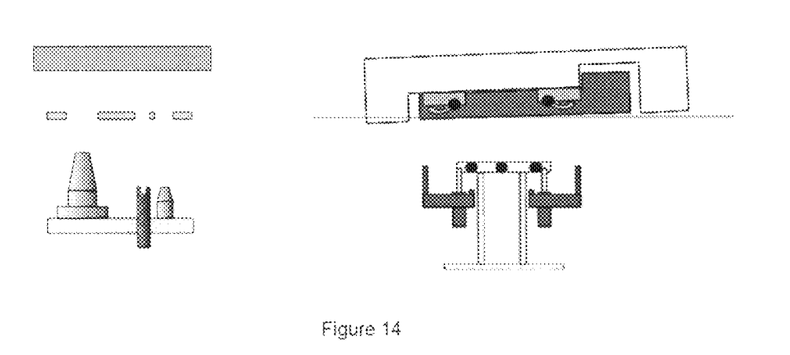

With reference to FIG. 12, the locking elements 16 of each tool 12 actuate the associated fixing bolt 17 from an unlocking configuration, initially releasing the battery 10 in relation to the chassis 11, to a locking configuration, blocking the battery 10 on the chassis 11. This locking results for example from a screwing action, symbolized by the rotary arrows F19. The chassis 11 remains at a height H in relation to the plane P, while the battery 10 is lifted F20 along axis Z under the action of the hooks 18 which pivot upward during screwing, to come to rest against the chassis 11 and cause a controlled connection of the battery 10. In the variant shown, actuation of the bolt 17 is conditional upon the release F21 of the safety mechanism of the bolt 17 by the release elements 24.

Finally, the tools 12 are lowered F22 by a downward movement F23 of the lifting elements 28 along axis Z until a loss of contact (FIG. 13) between the bearing elements 15 and the underside 25 of the chassis 11. The seating operation is terminated and the vehicle (and hence the chassis 11) resumes any arbitrary and free orientation in relation to the plane P. Then the locking and/or unlocking system adopts a global configuration in FIG. 14 identical to that shown in FIG. 1.

The concept described above by application to a battery and a vehicle may be extended to any heavy load placed or suspended below a structure, and for example intended to be brought into movement (by truck, railway freight, boat, aircraft, cargo etc.).

The solution described above also has the following advantages:

economic provision of tools and a battery exchange station, makes it possible not to reinvest in tooling on each refinement of the design and/or the position of the battery fixings, limits the risks of breakdowns linked to geometric faults by the use of bolts 17 with lifting hooks 18, seating of the vehicle by referencing in axis Z on the bolt support 26 and not on the vehicle, making this independent of the vehicle and therefore standardizable, the unlocking and locking may be carried out with a standard screwing operation and not only with a quarter-turn system requiring a specific tool, the battery 10 may be deposited on a conventional conveyor 29 which is therefore low cost, during evacuation of the discharged battery 10 ("empty"), the charged battery 10 ("full") is supplied: these two operations are therefore performed in overlap and not sequentially, hence a cycle time-saving which is profitable for the user.

The invention claimed is:

1. A system for locking and/or unlocking an object, the system comprising a plurality of tools, each tool comprising:
   alignment elements configured to align said tool in relation to the object along a longitudinal axis of a structure and along a transverse axis of the structure;
   bearing elements configured to bear against an underside of the structure, and configured to allow seating of the structure around the longitudinal axis of the structure and/or around the transverse axis of the structure; and
   locking and/or unlocking elements configured to actuate a fixing bolt between a locking configuration, blocking the object below the structure, and an unlocking configuration, releasing the object in relation to the structure,
   wherein the bearing elements are insertable into the object, and
   wherein the bearing elements allow lifting of the structure along a vertical axis to a height independent of the structure.

2. The locking and/or unlocking system as claimed in claim 1, wherein the alignment elements are configured so as to cooperate with centering elements integrated in the object, the alignment elements being inserted in the centering elements and/or the centering elements being inserted in the alignment elements.

3. The locking and/or unlocking system as claimed in claim 1, wherein each tool comprises release elements to actuate a safety mechanism of the fixing bolt between a blocking configuration, in which the fixing bolt cannot be transferred from one configuration to another, and a release configuration, in which the fixing bolt can be transferred from one configuration to another.

4. The locking and/or unlocking system as claimed in claim 3, wherein the release elements are configured such that contact of the bearing elements against the underside of the structure, on the seating of the structure and where applicable during lifting of the structure, automatically initiates actuation, via the release elements, of the safety mechanism toward the release configuration.

5. The locking and/or unlocking system as claimed in claim 1, wherein the bearing elements and/or the release elements are formed by an upper end of at least one of the alignment elements.

6. The locking and/or unlocking system as claimed in claim 1, wherein the bearing elements are configured to come into contact, on the seating of the structure and where applicable during lifting of the structure, with a bolt support interposed between the fixing bolt and the structure.

7. The locking and/or unlocking system as claimed in claim 1, wherein each tool comprises a carrier element designed to support the object after release of the object by the fixing bolt in relation to the structure.

8. The locking and/or unlocking system as claimed in claim 1, wherein the system comprises lifting elements on which the tools are mounted, the lifting elements being configured to move the tools between:
   a lower position arranged substantially next to or below a conveyor ensuring a supply of objects to be mounted on the structure and an evacuation of objects removed from the structure, and
   an upper position in which the tools are in contact with the structure to ensure the seating of the structure and where applicable the lifting of the structure, and can actuate the fixing bolts.

9. The locking and/or unlocking system as claimed in claim 8, wherein the objects are electrically discharged batteries.

10. A device for mounting and/or removal of an object, the device comprising a locking and/or unlocking system as claimed in claim 1, and a plurality of fixing bolts integral with the object and/or the structure, each of which can be actuated between a locking configuration, blocking the object on the structure, and an unlocking configuration, releasing the object in relation to the structure, and arranged such that the locking and/or unlocking elements of each tool of the locking and/or unlocking system actuate one of the fixing bolts to change the configuration.

11. The device as claimed in claim 10, wherein the object is a power supply battery of a drive motor of an electric or hybrid motor vehicle, and the structure is a chassis of the vehicle.

12. The locking and/or unlocking system as claimed in claim 1, wherein the object is a power supply battery of a drive motor of an electric or hybrid motor vehicle, and the structure is a chassis of the vehicle.

13. The locking and/or unlocking system as claimed in claim 1, wherein the alignment elements, and the locking and/or unlocking elements are inserted into the object.

14. A system for locking and/or unlocking an object, the system comprising a plurality of tools, each tool comprising:
   alignment elements configured to align said tool in relation to the object along a longitudinal axis of a structure and along a transverse axis of the structure;
   bearing elements configured to bear against an underside of the structure, and configured to allow seating of the structure around the longitudinal axis of the structure and/or around the transverse axis of the structure; and
   locking and/or unlocking elements configured to actuate a fixing bolt between a locking configuration, blocking the object below the structure, and an unlocking configuration, releasing the object in relation to the structure,
   wherein the bearing elements are insertable into the object, and
   wherein the alignment elements are configured so as to cooperate with centering elements integrated in the object, the alignment elements being inserted in the centering elements and/or the centering elements being inserted in the alignment elements.

15. A system for locking and/or unlocking an object, the system comprising a plurality of tools, each tool comprising:
   alignment elements configured to align said tool in relation to the object along a longitudinal axis of a structure and along a transverse axis of the structure;
   bearing elements configured to bear against an underside of the structure, and configured to allow seating of the structure around the longitudinal axis of the structure and/or around the transverse axis of the structure; and locking and/or unlocking elements configured to actuate a fixing bolt between a locking configuration, blocking the object below the structure, and an unlocking configuration, releasing the object in relation to the structure, wherein the bearing elements are insertable into the object, and wherein the bearing elements are configured to come into contact, on the seating of the structure and where applicable during lifting of the structure, with a bolt support interposed between the fixing bolt and the structure.

* * * * *